United States Patent Office 3,199,349
Patented Aug. 10, 1965

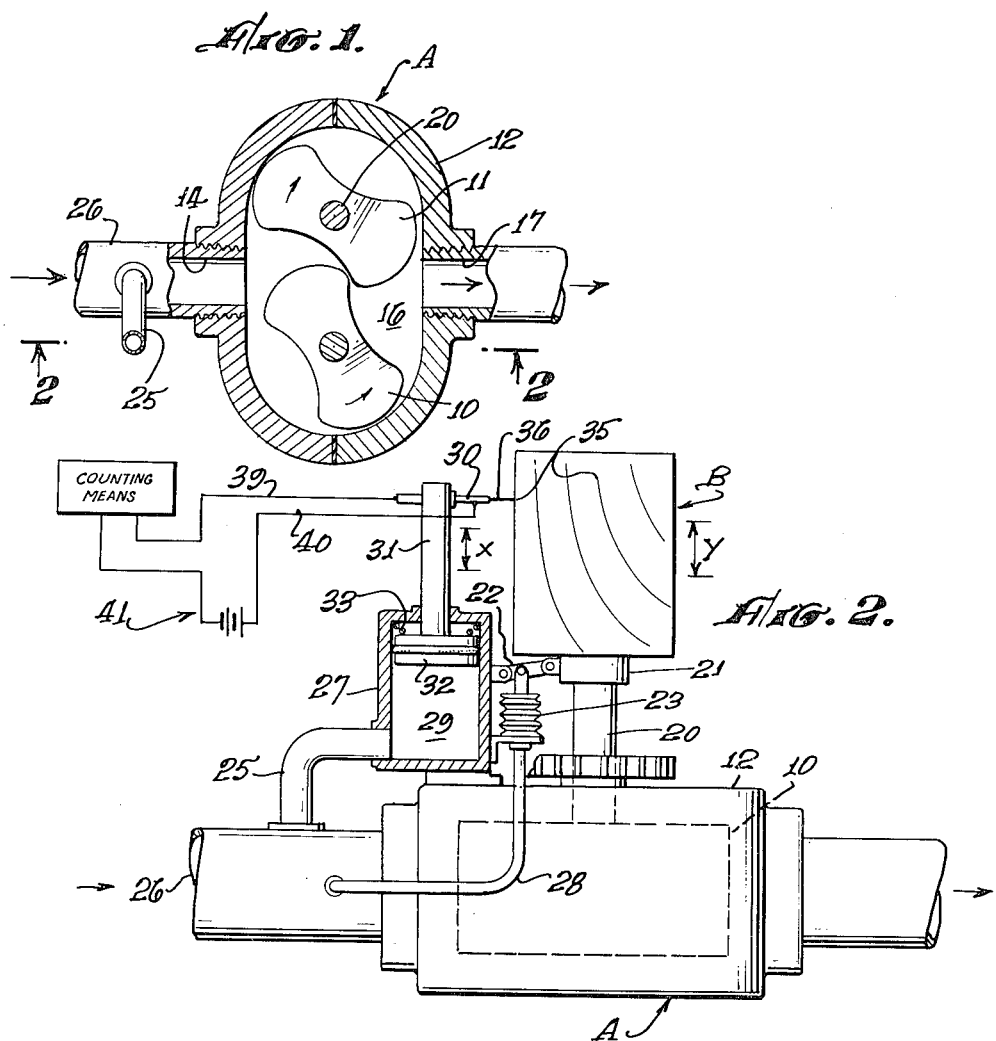

3,199,349
MEASURING METER
David H. Silvern, North Hollywood, Calif., assignor to Dresser Industries, Inc., Dallas, Tex., a corporation of Delaware
Filed Apr. 22, 1963, Ser. No. 274,410
5 Claims. (Cl. 73—233)

This invention relates to measuring meters, and more particularly to an improved meter for measuring the flow of a compressible fluid.

Measuring wheel meters are well known in the art and are, in general terms, those types of fluid measuring meters which measure the volume of fluid passing through the meter by counting the number of revolutions imparted to the measuring wheel by the impinging flow of fluid on a rotatable body placed in the flow stream. Such wheel meters include meters utilizing impeller or turbine wheels, paddle-wheels, screw wheels and Roots-type meters. Although not limited thereto, the present invention has been found to be particularly useful in connection wtih Roots-type meters and will be described in connection therewith as an illustrative embodiment. Such measuring wheel meters are satisfactory in the accurate measurement of non-compressible fluids, but are unsatisfactory for accurate measurement of compressible fluids since the volume of a given mass of gas flowing through the meter is a function of temperature and pressure of the gas. That is, unlike liquids, the volume of a given mass of gas is subject to comparatively great change upon a change in temperature, pressure, or chemical composition of the gas. Since the mass of gas is often the quantity desired to be measured, a meter which measures only the volume is insufficient for many purposes. For this reason, the mere measurement of the volume-flow of gas, which would be the direct function of a rotatable body rotated by the flowing gas, is inadequate to give the true value of the gas flow.

Other meters are known to the art for measuring the mass of gas flowing through a measuring wheel-type meter by compensating for changes in pressure and temperature of the gas, but those meters heretofore known to the art are complex in operation and are not direct reading meters which compensate automatically for the changes in variables.

Such meters known to the prior art are slow in giving an indication that variables have changed or in reacting to a change in such variables.

Accordingly, it is an object of the present invention to provide an improved meter for measuring the quantity of gas flowing in a stream.

It is another object of the present invention to provide an improved metering device for automatically compensating for changes in variables and producing a direct reading of the mass of gas flowing through the meter.

Another object of the present invention is to provide a meter for direct readout of quantities of gas flowing therethrough when the temperature and pressure of the gas may vary.

Yet another object of the present invention is to provide such a meter which is simple of construction and efficient in operation.

The present invention is a mass-measuring meter which comprises a Roots-type meter, the rotors of which are caused to rotate by the gas passing therethrough. Rotation of the rotor causes a shaft to be turned at a rate which is a function of the volume of gas passing through the meter. To the shaft is affixed a cylindrical body longitudinally movable with respect to the shaft. The longitudinal position of the cylinder is a function of a first variable in the gas being metered. Upon the surface of the cylinder, there are positioned a series of lines arranged in a predetermined mathematical relationship. A counting device is positioned in proximity to the cylindrical surface, its longitudinal position with respect thereto being a function of a second variable in the gas. The counting device is such that it will count the number of lines passing a given point on the cylinder, which number of lines is a function of the mass of gas passing through the meter.

The novel features which are believed to be characteristic of the invention, both as to its organization and method of operation, together with further objects and advantages thereof, will be better understood from the following description, considered in connection with the accompanying drawing, in which a presently preferred embodiment is illustrated by way of example. It is to be expressly understood, however, that the description is for the purpose of illustration and example only, and that the true spirit and scope of the invention is defined by the accompanying claims.

In the drawings:

FIGURE 1 is a view in partial cross section of the presently preferred embodiment of the present invention;

FIGURE 2 is a sectional view taken along the line 2—2 of FIGURE 1; and,

FIGURE 3 is a view of the surface of the spindle, showing the measuring lines on a planar surface.

Although the present invention is applicable to compressible fluids, in general, its particular utility will be in connection with the measurement of the mass of gases and will accordingly be described in connection with gas as the fluid. Further, although other types of volume-measuring meters can be used, meters of the well-known Roots blower-type are particularly adaptable to the present invention and it will be described in connection with such meters.

As is well known, the pressure-volume-temperature relation for gases is given by the characteristic equation for gases which is $PV=RT$ where R is a constant for any gas and is called the gas constant. Since an impeller-type meter is rotated by the volumue of gas passing the impellers and the meter reading is based on the rate of rotation, the reading is only a function of volume and the mass of gas flowing will be varied by changes in pressure and temperature. The present invention provides a direct readout from the meter as a function of mass by introducing changes due to pressure and temperature changes into the meter quickly and accurately.

Referring now to the drawings, there is shown a Roots meter designated generally as A. The characteristic feature of the Roots meter is a pair of pistons 10 and 11 which rotate continuously within a sealed casing 12, in opposite directions, as indicated by the direction of the arrows. The pistons are in contact whereby the surfaces thereby carry out a rolling movement on each other. The pistons are typically of two-wing construction, as shown in the figures. Gas enters the housing 12 through an inlet port 14. In order to pass through the interior volume 16 of the housing 12, the gas must rotate the rotors 10 and 11 in the direction shown, after which the gas passes from the housing through the gas outlet 17. Thus, the volume of gas passing through the housing 12 in a given period of time causes the rotors 10 and 11 to revolve a given number of revolutions during that period of time, which revolutions are a direct function of the volume of gas passing through the meter A.

As discussed previously, however, the mass of gas flowing through the meter will vary if the pressure or temperature, or both, vary as the gas passes through the meter, since the meter measures only the volume-flow by the rotation of the rotors. Accordingly, in the present invention, there is positioned on one of the shafts 20 of the rotors, designated the "meter shaft," a cylinder B which rotates with one of the rotors 11. The cylinder B is longitudinally movable along the shaft, as shown by the arrows in FIGURE 2, and its movement along the shaft is determined by the change in one of the variables, that is, the temperature or pressure. In the embodiment shown, the movement of the cylinder is caused by variations in temperature of the gas. To this end in this embodiment, the cylinder B is affixed to a tubular sleeve 21 which is slidably but non-rotatably mounted upon the meter shaft 20. A linkage 22 is connected between the sleeve and a means for moving the linkage in response to temperature change. The means employed in the present embodiment is a temperature-expansible bellows 23 of the type well known to the art which expands as the temperature increases and contracts as the temperature decreases. Thus, as the temperature of a gas within the bellows 23 rises, the cylinder B will be moved upwardly in FIGURE 2, and as the gas decreases in temperature, the bellows 23 will contract and cause the cylinder B to be moved downwardly in FIGURE 2. A gas sampling line 25 is therefore connected to the gas line 26 leading to the inlet of the Roots meter A. This gas-sampling line 25 is connected to a pressure chamber 29 defined by a housing 27. The temperature-sampling line 28 leads from the gas inlet line 26 to the temperature reactive means 23. The rate of movement of the cylinder B along the shaft 20 is described more specifically hereinafter.

A readout device 30, more specifically defined hereinafter, is adapted to count the number of lines passing beneath it along the surface of the cylinder and such readout device 30 is longitudinally movable relative to the cylinder in response to pressure changes of the gas within the gas inlet line 26. To this end, the readout device 30 is affixed to a shaft 31 which is in turn connected to a piston 32 movable within the pressure chamber 29. The piston 32 is spring-loaded by a spring 33 against which the piston must be moved by the pressure of the gas in the chamber 29. Thus, as the pressure of the gas increases in the gas inlet line 26, it correspondingly increases in the chamber 29 and exerts a greater upward force on the piston 32 to thereby move the shaft 31 upwardly in FIGURE 2, causing the readout device 30 to also be moved upwardly with respect to the surface of the cylinder B. Conversely, as the pressure decreases, the piston is lowered in FIGURE 2, causing the readout device to be moved downward or toward the meter A in the orientation of FIGURE 2. Cam linkages of the type well known to the art can be utilized to achieve a movement of the cylinder and readout device which movement is non-linear or according to a predetermined function of linearity as discussed hereinafter.

Referring now to FIGURES 2 and 3, the surface of the cylinder B is provided with a series of electrically conductive lines formed thereon in a predetermined mathematical pattern. The pattern of the lines is such that the interrelationship between the distance that the cylinder B is moved in response to temperature changes and the distance through which the readout device 30 is moved in response to pressure changes are such that the number of lines passing beneath the readout device is a direct function of the mass of the gas flowing through the meter. If the longitudinal distance through which the cylinder B is moved in response to temperature changes is designated as Y, then the movement of the cylinder must be in accordance with the relationship that $Y = \ln T$. If the distance through which the readout device 30 is moved in response to pressure changes is designated as X, then X must equal $\ln P$. The number of lines N at any given position, Z, along the surface of the cylinder is then equal to $Ke^z$ or since $Z = X - Y$, $N = Ke^{x-y}$. Then $$N = Ke^{\ln P - \ln T}$$

or $Ke^{\ln} P/T$. And $N = KP/T$. The electrically conductive lines 35 are then formed on the cylinder by a layout, as shown in FIGURE 3, in accordance with the above equations. The number of lines then passing beneath the readout device 30 in a given length of time are a direct measurement of the mass of gas flowing through the meter since $\dot{N}$ which is equal to the number of lines in a given length of time $= KP/T \times V = KM$ where K is a constant, depending upon the particular gas being metered.

The lines are formed upon the cylinder by one of many means known to the prior art for forming electrically conductive lines upon an insulating surface. Such lines may be formed, as for example, by metallizing techniques or by printed circuit techniques, it being essential only that such lines be capable of being counted by the readout device 30.

The readout device 30 is of the type which includes a contact element 36 at the end thereof which is maintained in contact with the surface of the cylinder B. Appropriate circuitry is included in the device to count the number of conducting stripes 35 which pass beneath the contact end. For example, the contact end has an opening in the circuit between leads 39 and 40. Upon passing over a conducting stripe 35, the circuit is completed by both ends being in contact with the conductor. Current then flows from the battery 41 through the circuit to an appropriate counter means, such as an electronic digital counter of the type well known to the art or, as another example, a low power solenoid of the type well known to the art which can be used to actuate a mechanical counter.

It will be appreciated by those skilled in the art that the present invention can be adapted to utilize stripes 35 of different character than described together with an appropriate readout device. For example, stripes which are above the plane of the cylinder can be utilized together with an appropriate readout device which counts the stripes mechanically or electro-mechanically.

Thus, the present invention provides a direct readout of the mass of gas passing through the meter. To adjust the meter for a different gas, i.e., one having a different gas constant, it is necessary only to replace the cylinder with one having the conducting stripes positioned in accordance with the formulas above, but with a different K in the equation which determines the spacing of the stripes.

What is claimed is:

1. A device for measuring and indicating a first quantity which is the function of two variables times a second quantity comprising: a rotatable cylinder; means for rotating the cylinder at a rate determined by the second quantity; a series of stripes on the surface of said cylinder so arranged that the number of said stripes at a predetermined axial position is a direct measurement of the first quantity as a function of the rate of rotation, a readout station; means for reading the number of stripes passing said readout station, means for moving the readout station axially along the cylinder in response to the first variable; and, means for moving the cylinder axially in response to the second variable.

2. A measuring meter apparatus for directly measuring the mass of gas flowing through the meter comprising: a meter body; a cylinder exteriorly of said body; means for rotating said cylinder in response to the volume of gas flowing through said meter body; a series of spaced apart stripes on the surface of said cylinder so arranged that the number of stripes on the surface of said cylinder at a predetermined axial position is directly proportional to the mass of gas as a function on the rate of rotation; a readout station; means for reading the number of stripes passing said readout station; means for moving the readout station axially with respect to said cylinder in response to variations in pressure of the gas; and, means for moving said cylinder axially in response to variations in temperature of said gas.

3. A measuring meter apparatus for directly measuring the mass of gas flowing through the meter comprising: a meter body; a cylinder exteriorly of said body; means for rotating said cylinder in response to the volume of gas flowing through said meter body; a series of spaced apart stripes on the surface of said cylinder so arranged that the number of stripes on the surface of said cylinder at a predetermined axial position is directly proportional to the mass of gas as a function of the rate of rotation; a readout station; means for reading the number of stripes passing said readout station; means for moving the readout station axially with respect to said cylinder in response to variations in temperature of the gas; and, means for moving said cylinder axially in response to variations in pressure of said gas.

4. A measuring meter apparatus for directly measuring the mass of gas flowing through the meter which gas changes in pressure and temperature, in accordance with the relationship $M = VK \cdot P/T$, where $M$=mass, $V$=volume, $P$=pressure, $T$=temperature and K is a gas constant comprising: a meter body; a cylinder exteriorly of and connected to said body; means for rotating said cylinder in response to and as a function of the volume of gas flowing through said meter body; a series of stripes on the surface of said cylinder so positioned that at any axial position, Z, along said cylinder the number of lines, N, at said axial position is equal to $Ke^z$; a readout means for reading the number of stripes N at said axial position Z; means for moving said readout means axially through a distance X, where $X = 1nP$, in response to change in pressure P of the gas; and, means for moving said cylinder axially through a distance Y, where $Y = 1nT$, in response to changes in temperature T, and where $Z = X - Y$.

5. A measuring meter apparatus for directly measuring the mass of gas flowing through the meter which gas changes in pressure and temperature in accordance with the relationship $M = VK \cdot P/T$, where $M$=mass, $V$=volume, $P$=pressure, $T$=temperature and K is a gas constant comprising: a meter body; a cylinder exteriorly of and connected to said body; means for rotating said cylinder in response to and as a function of the volume of gas flowing through said meter body; a series of stripes on the surface of said cylinder so positioned that at any axial position, Z, along said cylinder the number of lines, N, at said axial position is equal to $Ke^z$; a readout means for reading the number of stripes N at said axial position Z; means for moving said readout means axially through a distance X, where $X = 1nT$, in response to changes in temperature T of the gas; and, means for moving said cylinder axially through a distance Y, where $Y = 1nP$, in response to changes in pressure P, and where $Z = X - Y$.

References Cited by the Examiner
UNITED STATES PATENTS

| | | | |
|---|---|---|---|
| 1,881,572 | 10/32 | Herz | 73—261 X |
| 1,902,112 | 3/33 | Young | 73—233 X |
| 1,957,746 | 5/34 | Young. | |
| 3,073,157 | 1/63 | Gehre | 73—194 |

RICHARD C. QUEISSER, *Primary Examiner.*

DAVID SCHONBERG, *Examiner.*